United States Patent
Simpson et al.

(10) Patent No.: US 7,450,256 B2
(45) Date of Patent: Nov. 11, 2008

(54) PRE-DEFINED PRINT OPTION CONFIGURATIONS FOR PRINTING IN A DISTRIBUTED ENVIRONMENT

(75) Inventors: Shell Sterling Simpson, Boise, ID (US); Ward Scott Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1094 days.

(21) Appl. No.: 09/905,506

(22) Filed: Jul. 12, 2001

(65) Prior Publication Data
US 2003/0014446 A1 Jan. 16, 2003

(51) Int. Cl.
*G06F 15/00* (2006.01)
*G06K 1/00* (2006.01)

(52) U.S. Cl. ............ 358/1.15; 358/1.9; 358/1.12; 358/1.13; 358/1.14; 358/1.16; 715/205; 715/209; 707/104.1

(58) Field of Classification Search ....... 358/1.11–1.18, 358/1.9; 710/72; 707/525, 104.1; 345/594; 715/502, 523, 205, 209; 235/380; 714/47
See application file for complete search history.

(56) References Cited

U.S. PATENT DOCUMENTS

| | | | | |
|---|---|---|---|---|
| 6,029,182 A * | 2/2000 | Nehab et al. | ............... | 715/205 |
| 6,314,432 B1 * | 11/2001 | Potts, Jr. | ............... | 707/104.1 |
| 6,327,051 B1 * | 12/2001 | Moro et al. | ............... | 358/1.9 |
| 6,384,933 B1 * | 5/2002 | McGinnis et al. | ............... | 358/1.18 |
| 6,490,052 B1 * | 12/2002 | Yanagidaira | ............... | 358/1.15 |
| 6,550,024 B1 * | 4/2003 | Pagurek et al. | ............... | 714/47 |
| 6,618,162 B1 * | 9/2003 | Wiklof et al. | ............... | 358/1.15 |
| 6,704,122 B2 * | 3/2004 | Moro et al. | ............... | 358/1.9 |
| 6,741,262 B1 * | 5/2004 | Munson et al. | ............... | 345/594 |
| 6,791,703 B1 * | 9/2004 | Maeda et al. | ............... | 358/1.15 |
| 6,930,788 B1 * | 8/2005 | Iwamoto et al. | ............... | 358/1.15 |
| 6,967,728 B1 * | 11/2005 | Vidyanand | ............... | 358/1.12 |
| 6,992,782 B1 * | 1/2006 | Yardumian et al. | ............... | 358/1.13 |
| 7,046,384 B2 * | 5/2006 | Ferlitsch et al. | ............... | 358/1.15 |
| 7,072,059 B2 * | 7/2006 | Van Der Linden et al. | . | 358/1.15 |
| 7,072,067 B2 * | 7/2006 | Leiman et al. | ............... | 358/1.15 |
| 7,086,001 B1 * | 8/2006 | Hicks et al. | ............... | 715/523 |
| 2001/0034747 A1 * | 10/2001 | Fujitani et al. | ............... | 707/525 |
| 2002/0059489 A1 * | 5/2002 | Davis | ............... | 710/72 |
| 2002/0113989 A1 * | 8/2002 | Ferlitsch et al. | ............... | 358/1.15 |
| 2002/0135800 A1 * | 9/2002 | Dutta | ............... | 358/1.15 |
| 2003/0076521 A1 * | 4/2003 | Li et al. | ............... | 358/1.13 |
| 2004/0172589 A1 * | 9/2004 | Small | ............... | 715/502 |
| 2005/0236473 A1 * | 10/2005 | Lenz et al. | ............... | 235/380 |

OTHER PUBLICATIONS

HP LaserJet 4050, 4050T, 4050N, and 4050TN Printers User's Guide, Hewlett-Packard Company, 1999, cover page, title pages and pages xv-xix, and 60.
nternet Reference "HP LaserJet 1100 and 2100 Printer Families—Explanation of Quick Sets", http://www.hp.com/cgi-bin/cposupport/printerfriendly.cgi?in=printers/support_doc/bp106693, printed Jun. 27, 2001, 2 pages.

* cited by examiner

*Primary Examiner*—Edward L. Coles
*Assistant Examiner*—Satwant K Singh

(57) ABSTRACT

Pre-defined print option configurations for printing in a distributed environment are established by user selection of one or more print options via a network service. The one or more print options are identified for subsequent resolution, and can be applied to one or more other network services.

24 Claims, 9 Drawing Sheets

PRE-DEFINED PRINT OPTION CONFIGURATIONS FOR PRINTING IN A DISTRIBUTED ENVIRONMENT

TECHNICAL FIELD

This invention relates to printing and distributed environments, and more particularly to pre-defined print option configurations for printing in a distributed environment.

BACKGROUND

As computer technology has advanced, the role of computers in our daily lives has expanded, as has the need for various peripheral or supporting devices. One typical peripheral device used with computers is a printer, which generates a hard copy of data that is used by the computer. The types and capabilities of printers available has similarly been expanding, resulting in a wide variety of printers with a range of printing capabilities, performance, and price.

One significant expansion in the use of computer technology is the networking of computers together. Networking computers together allows the computers to communicate with one another as well as with other devices, such as printers. Currently, in order for a user of a computing device to print to printers on a network, the user is required to configure the printers individually. For example, each printer that the user desires to print to in draft quality mode typically must be configured individually to be in draft quality mode. Such requirements on configuring printers are tedious for users, resulting in a user-unfriendly experience. It would thus be beneficial to provide a way to improve the user's ability to configure printers in a user-friendly manner. The importance of such an improvement increases as the use and capabilities of networks continues to expand.

SUMMARY

Pre-defined print option configurations for printing in a distributed environment are described herein.

According to one aspect, a user selection is received of one or more print options via a network service (e.g., an Internet imaging home page). The one or more print options are identified (e.g., stored as a particular named configuration) for subsequent resolution (e.g., by a printer or print service during subsequent printing of a document). The one or more print options can be applied to one or more other network services (e.g., one or more printers or print services).

DETAILED DESCRIPTION

Pre-defined option configurations for printing in a distributed environment are described herein. Various print options can be selected as a set or configuration and assigned a name by a user via one service in the distributed environment. The print options in a particular set or configuration can then be identified, by name, for subsequent resolution and applied to one or more other services in the distributed environment.

Print options serve to configure a printer in a particular manner for printing. Each print option used to configure a printer affects how the printer will print documents it receives, and/or how it will pre-process (or post-process) the document to be printed (or already printed). These print options are typically applied regardless of the underlying data in the document being printed and the format of such data (e.g., its font, color, etc.). A wide variety of print options are commonly known, and include, for example, duplex or single-sided printing, automatic conversion of document to the size of paper in the printer (or a particular tray of the printer), automatic stapling of the printed document, the type of stapling (e.g., saddle staple), collation of the printed document, a number of copies of the document to print, a print quality of the document, a particular print media source (e.g., a manual input tray on the printer), selection of a watermark, binding options, cutting options, and so forth.

Figure 1:
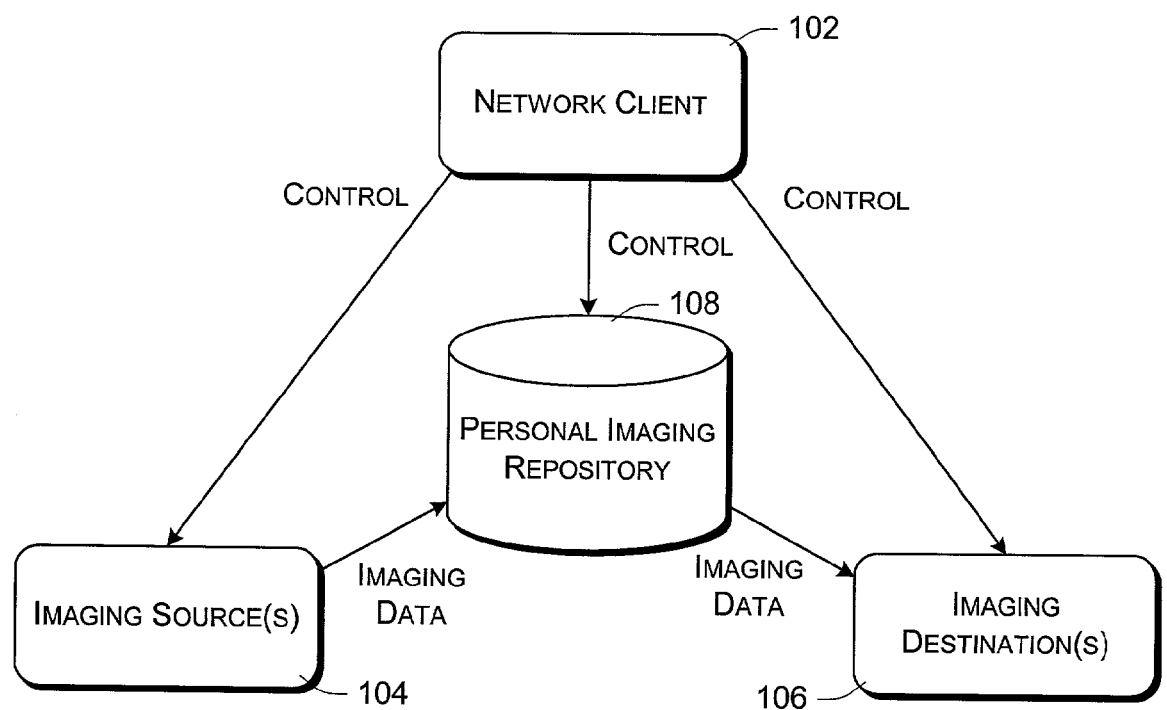
FIG. 1 illustrates an exemplary distributed system in which pre-defined print option configurations can be used.

FIG. 1 illustrates an exemplary distributed system 100 in which predefined print option configurations can be used. In system 100, a network client device 102 is in communication with one or more imaging sources 104, one or more imaging destinations 106, and a personal imaging repository 108. A user of client device 102 can communicate with imaging source(s) 104 to select or identify images to be stored in personal imaging repository 108. Imaging sources 104 represent any of a wide variety of devices that are capable of providing images to other devices. Examples of imaging sources 104 include computers, cameras (e.g., digital still or video cameras), scanners, applications, web sites, and so forth.

Repository 108 represents image storage facilities personalized to the individual user, although alternatively multiple users may have access to the same repository 108. Repository 108 is maintained on one or more computers, such as network client 102, an imaging source(s) 104, an imaging destination(s) 106, another computer (not shown), or combinations thereof. The "images" or "graphics" in repository 108 can be any type of printable data, such as text, drawings, frames of video or animations, pictures, combinations thereof, and so forth.

The user, via network client 102, can select images from imaging repository 108 to be communicated to imaging destination(s) 106 for printing in accordance with pre-defined print option configurations identified by the user. Imaging destination 106 represents any of a wide variety of devices that are capable of processing images in some manner. Examples of imaging destinations 106 include printers, plotters, services managing printing devices, and so on.

Figure 2:
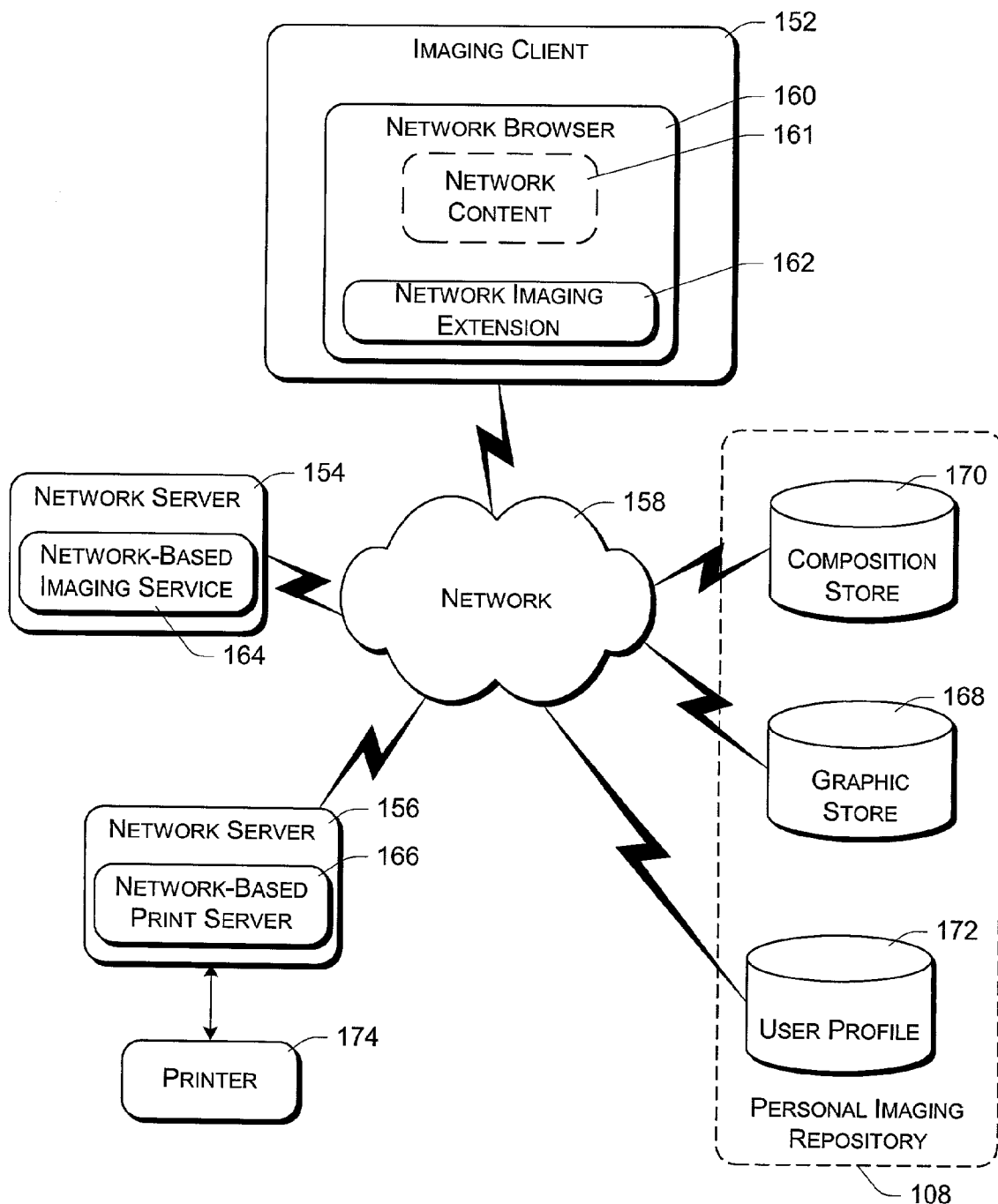
FIG. 2 illustrates an exemplary distributed system illustrating the use of pre-defined print option configurations in a distributed environment in additional detail.

FIG. 2 illustrates an exemplary distributed system 150 illustrating the use of pre-defined print option configurations in a distributed environment in additional detail. System 150 includes an imaging client 152 coupled to multiple network servers 154 and 156 via a network 158. Client 152 and servers 154 and 156 represent any of a wide variety of conventional wired and/or wireless computing devices, such as desktop computers, portable computers, dedicated server computers, multi-processor computing devices, cellular telephones, personal digital assistants (PDAs), handheld or pen-based computers, gaming consoles, and so forth.

Network 158 represents one or more conventional data distribution networks that can be used to communicate data and other information (e.g., control information) between or among various computing devices. Examples of network 158 include the Internet, a local area network (LAN), a public or private wide area network (WAN), combinations thereof, and so on. Network 158 can include multiple different types of networks, including wired and/or wireless portions, employing any of a wide variety of different communications protocols, including public and/or proprietary communications protocols.

During operation, a network browser 160 executing on imaging client 152 allows a user of client 152 to interact with network servers 154 and 156, as well as network services executing on such servers. Network browser 160 includes a network imaging extension 162 that allows network content 161 executing in browser 160 to communicate with the user's personal imaging repository 108, which may include communication with services via network 158. As used herein, services refer to software components that can execute on one or more computing devices and are accessible to provide functionality to imaging client 152, such as imaging sources, imaging destinations, printer configuration components, and so forth. Network imaging extension 162 can be implemented in any of a wide variety of manners, such as an application programming interface (API) providing methods that can be called by content 161 and used to interact with servers 154 and 156 (e.g., to load, save, modify, delete, etc. documents).

Network server 154 executes a network-based imaging service 164 that allows a user of browser 160 to interact with his or her personal imaging repository (e.g., add, remove, and/or modify graphics in the repository) and identify an image for printing. Images identified or selected for including in the user's personal imaging repository can be indicated by value (e.g., the actual image data) or by reference (e.g., a pointer to or identifier of the image stored elsewhere). The network-based imaging service 164 also allows a user to identify configurations (of pre-defined print options) for the printer(s) on which the image will be printed. The image to be printed can be made up of graphics from one or more different graphic sources, and include any type of printable data (e.g., text, graphics, and so forth).

Network-based imaging service 164 represents one or more services accessible to imaging client 152. Each service can execute on the same server or alternatively on multiple different servers. These different services can provide different functionality (e.g., one service may be responsible for graphic storage and retrieval functionality, while another service is responsible for merge functionality allowing graphics to be merged together). Additionally, some services may be fully or partially overlapping in functionality provided by other services, allowing a degree of fault-tolerance to be built into system 150 (e.g., one service can take over the responsibilities of another if the other fails).

The graphic for an image is received from a graphic store 168 and/or a composition store 170. Graphic store 168 stores individual graphics (also referred to as documents or more generally data capable of being represented as a two dimensional graphic), such as individual files. These individual graphics in store 168 can be used as individual printable images via imaging service 164. Each individual graphic can be any of one or more types of printable data (e.g., text, pictures, etc.), and may result in multiple hard copy pages when printed. Additionally, a user of browser 160 may identify multiple individual graphics from graphic store 168 that are to be compiled together as a single image for printing. In this situation, network-based imaging service 164 provides an interface that allows the user of browser 160 to select different individual images and store the compilation of individual images as a single composition document (also referred to as a composition image) in composition store 170. The composition document may include the actual data from the individual images, or alternatively identifiers (e.g., file name and path, or Uniform Resource Locators (URLs)) of where the individual images can be retrieved for printing or displaying to the user.

Graphic store 168 and composition store 170 are illustrated in system 150 as two separate stores. Alternatively, multiple such stores may exist in system 150, and one or more graphic stores may be combined with one or more composition stores. Additionally, one or more of these stores 168 or 170 may be implemented on one of servers 154 or 156, and/or imaging client 152.

Network-based imaging service 164 also provides an interface via which a user of browser 160 can pre-define print option configurations and subsequently select those pre-defined configurations. These configurations defined by a user are stored at server 154, or alternatively elsewhere in system 150 as user profile 172. Any number of configurations can be defined by the user. Each configuration (also referred to as a "set") is a grouping of one or more print options that are selected by the user. Each print option also has an associated setting, which may be explicitly or implicitly supplied by the user. For example, if the user selects the "duplex" option then the user has implicitly assigned a setting of "on" to duplex printing (and also possibly "off" to single-sided or simplex printing). However, if the user desires to select the number of copies to be printed, then the user explicitly supplies the setting (that is, explicitly identifies the number of copies to be printed). The user is able to pre-define printer configurations at any time prior to printing. The print options, however, are not resolved for printing until later. In other words, the print options are not used to configure a printer in accordance with the print options until a later time when an image is being printed with the print options. The pre-definition and subsequent selection of printer configurations is discussed in more detail below.

In order to print an image, the user identifies the image (optionally selecting graphics that are to be part of the image) and any pre-defined printer configurations he or she desires via network-based imaging service 164. If the optional selecting of graphics is performed, it may be performed by the same network service as performs the pre-defined printer configuration identification, or alternatively a different service. A print request, including the image data and user-selected pre-defined printer configurations, are then communicated to network-based print server 166 executing on network server 156. Upon receipt of the print request, network-based printer server 166 interacts with a printer 174 coupled thereto to produce a hard copy of the image in accordance with the received pre-defined printer configurations.

Figure 3:
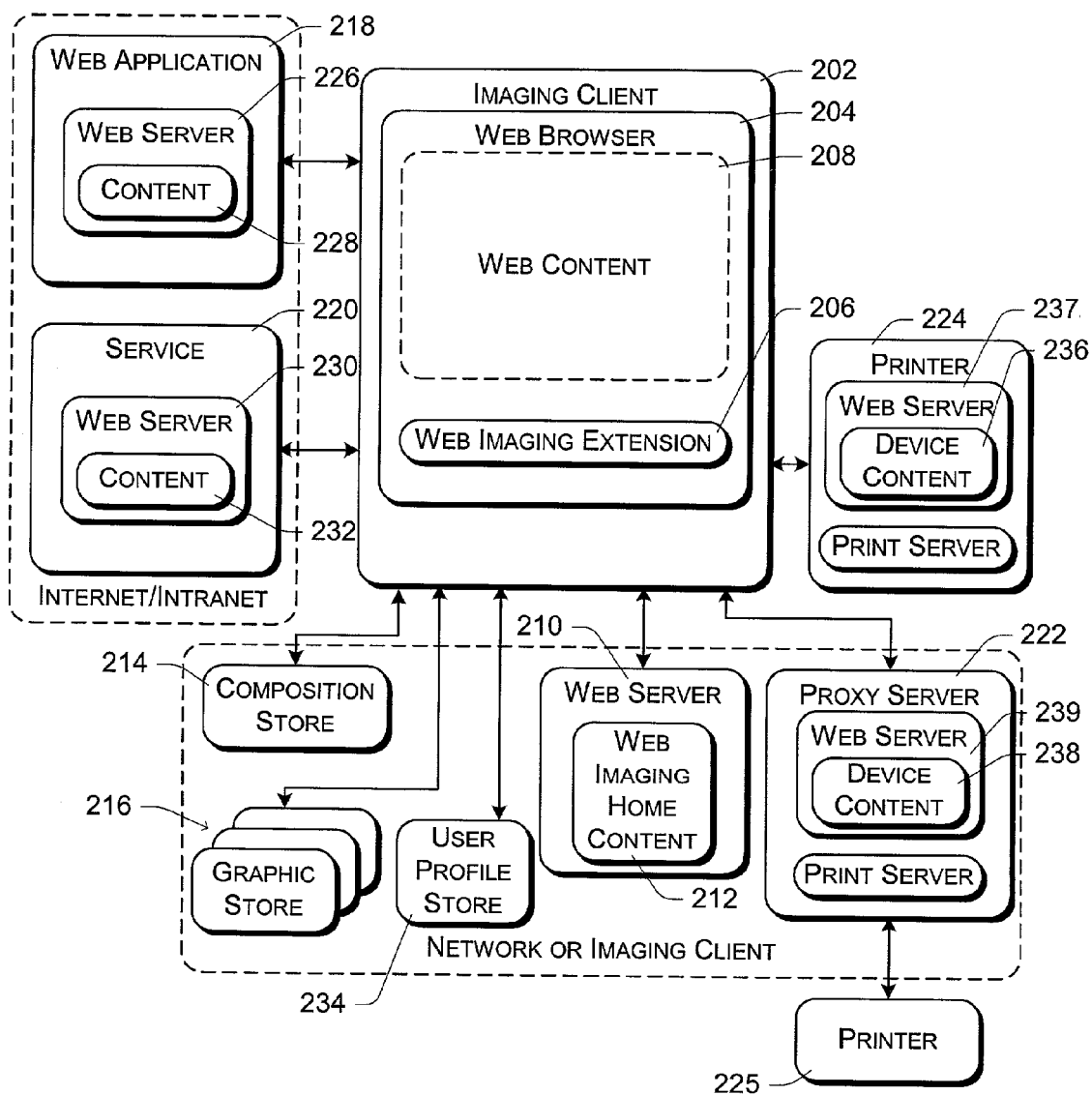
FIG. 3 illustrates an exemplary web-based architecture in which predefined printer configurations can be used.

FIG. 3 illustrates an exemplary web-based architecture 200 in which predefined printer configurations can be used. Web-based architecture 200 refers to the World Wide Web (or simply the Web), which is a distributed collection of interlinked, user-viewable documents (typically referred to as Web documents or Web pages) that are accessible via the Internet. The Web also refers to the client and server components which provide user access to such documents using standardized Internet protocols. Currently, the primary standard protocol for allowing applications to locate and acquire Web documents is the HyperText Transport Protocol (HTTP), and the Web pages are encoded using a standard markup language such as the HyperText Markup Language (HTML) or eXtensible Markup Language (XML). Alternatively, other protocols or languages may be used.

In architecture 200, an imaging client 202 (e.g., imaging client 152 of FIG. 2) includes a web browser 204 including a web imaging extension 206. Browser 204 is able to load and execute web content 208 (e.g., JavaScripts, Java applets or other web programs) from various sources. In the illustrated example, web browser 204 establishes a communication channel or connection with web server 210, causing web imaging home content 212 to be copied to imaging client 202 as at least part of web content 208. Although illustrated as being copied from web server 210, it is to be appreciated that web imaging home content 212 could alternatively be loaded from a local or intermediary source, such as a cache (not shown) implemented on imaging client 202. Additionally, any inputs by the user to web content 208 are typically handled by web content 208 rather than being returned to web imaging home content 212.

Once loaded in web browser 204, web content 208 can communicate, via web imaging extension 206, with other components in architecture 200, allowing access to a personal imaging repository as well as imaging sources and imaging destinations. In the illustrated example, the personal imaging repository includes composition store 214 and graphic store 216, the imaging sources include web application 218 and service 220, and the imaging destinations include proxy server 222 and printer 224. Web application 218 includes a web server 226 that maintains (or obtains/creates) content 228 accessible to web content 208. Similarly, service 220 maintains a web server 230 that maintains (or obtains/creates) content 232 accessible to web content 208. The content 228 and 232, when generated (e.g., from a file or dynamically) and executed on imaging client 202 (e.g., as part of web content 208), can make various functionality available to web content 208, such as image sources, combine multiple graphics into a composition document, etc.

Printer 224 and proxy server 222 each optionally include a print server for queuing and managing received print requests, and a web server 237 and 239 storing or dynamically generating device content 236 and 238, respectively. Device content 236 represents content (which may be generated dynamically) that is provided to the web browser 204 by the web server 237. Device content 236 is a web service available to imaging client 202 (e.g., displayed as a web page) that represents printer 224 and that can access the user's personal imaging repository. The device content 236, when downloaded and executed on client 202 (e.g., as part of web content 208), can access the stores 214 and 216 via web imaging extension 206 to obtain graphics and upload the graphics to printer 224 for printing. The upload to printer 224 is accomplished using existing conventional mechanisms (e.g., TCP/IP sockets and/or HTTP POST command(s)) that allow content executing within the browser to communicate with the server from which that content came. In the illustrated example, imaging extension 206 is only used to obtain graphics from the personal imaging repository, not to upload the graphics to the printer.

Proxy server 222 allows a printer(s) that does not host a web server to be represented by a web service. Proxy server 222 includes device content 238 and web server 239, which operate analogous to device content 236 and web server 237, respectively. The printer 225 is represented by device content 238 and graphics obtained by the device content 238 (presented in the context of the device). This device content, when downloaded and executed on client 202 (e.g., as part of web content 208), can upload graphics accessed through the imaging extension to proxy server 222, which in turn forwards these graphics to printer 225.

Web application 218 and service 220 may each be accessible by imaging client 202 via the Internet or via a local network (e.g., an Intranet). Each of the stores 214 and 216, as well as user profile store 234, web server 210, and proxy server 222, may be accessible via a network (e.g., an Intranet or the Internet) and/or located on imaging client 202.

During operation, web content 208 generates and renders, via web browser 204, one or more user interfaces (e.g., graphical user interfaces (GUIs)) that allows the user to interact with his or her personal imaging repository. This interaction includes allowing the user to select images or documents for printing, to identify pre-defined printer configurations to be used in printing selected documents, and to define printer configurations. Example user interfaces rendered by web content 208 are discussed below with reference to FIGS. 4, 5, and 6. The various interfaces can be separate web pages, or alternatively portions of another (or the same) web page.

Figure 4:
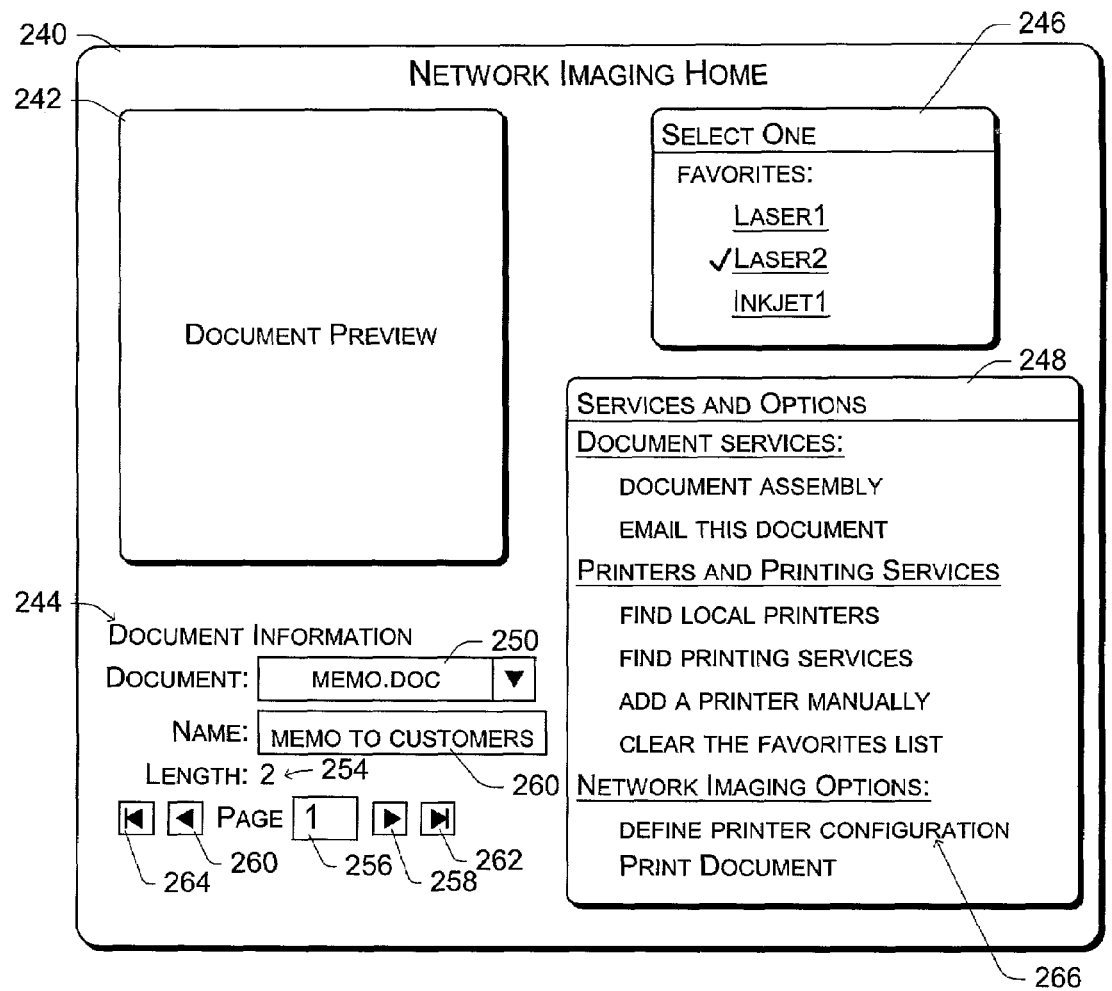
FIG. 4 illustrates an exemplary user interface presented by a web browser.

FIG. 4 illustrates an exemplary user interface presented by web browser 204 of FIG. 3. In the illustrated example, user interface 240 is displayed by web browser 204 as a result of loading the web imaging home content 212. User interface 240 includes a document preview window 242, a document information portion 244, a favorite printers portion 246, and a services and options portion 248. User interface 240 allows the user to select one or more documents for printing via document information portion 244. The user can select the desired document by name via a pull down menu input 250 or change the name of the selected document in name field 260. Alternatively, other document-selection input mechanisms may be supported, such as cutting and pasting of the document name, dragging and dropping an icon representing the document, supporting a "browse" feature allowing the user to search his or her personal imaging repository (or elsewhere) for documents, and so forth.

The length of the user-selected document (e.g., in pages) is illustrated in a length field 254. Document preview window 242 provides a location via which a small preview image of the document selected for printing (or other processing) is displayed to the user. A current page section 256 identifies the current page(s) being displayed in document preview window 242, and page manipulation buttons 258, 260, 262, and 264 allow the user to easily advance to the next page in the document, the previous page in the document, the last page of the document, or the first page of the document, respectively.

Favorite printers portion 246 identifies one or more printers that are selectable by the user for printing, and can include, for example, the user's preferred printers, suggested printers to be used by the user, default printers, and so forth. In the illustrated example, each printer identified in favorites portion 246 is identified by a hyperlink (illustrated as being underlined). The user can select one of the printers that the identified document is to be printed on by activating the hyperlink (e.g., by using a pointer control device to situate a pointer over the hyperlink on screen and click a button of the control device). Services and options portion 248 allows the user to identify or request options or services, such as to add a printer to favorites portion 246, clear favorites portion 246, print the document, and so forth.

One option that can be selected by the user via portion 248 is the define printer configuration option 266. Selection of the define printer configuration option 266 allows the user to define printer configurations and assign names to those configurations, thereby allowing the user to establish desired printer configurations and subsequently identify them by name (or other identifier). When the user subsequently requests to print a document, he or she can identify one of the printer configurations to apply for the printing, causing the options identified in that configuration to be used in printing the document. Each predefined configuration includes a setting of one or more print options.

It should be noted that the print options for a particular configuration are the user's desired options for that configuration. The print options are not printer-specific options, so situations can arise where options set in a particular configuration are not carried out because the printer on which the document is being printed does not support the option. Thus, the printer configurations can be viewed as requests or user desires when printing, with no guarantee to the user that they will actually be used when printing. By way of example, the user may define a configuration named "booklet" and identify that the printed document for the booklet configuration should be stapled. However, when the user prints the document, whether the document is stapled depends on the particular printer on which the document is printed. If that printer supports stapling, then it will staple the document; however, if that printer does not support stapling, then it will not staple the document.

Figure 5:
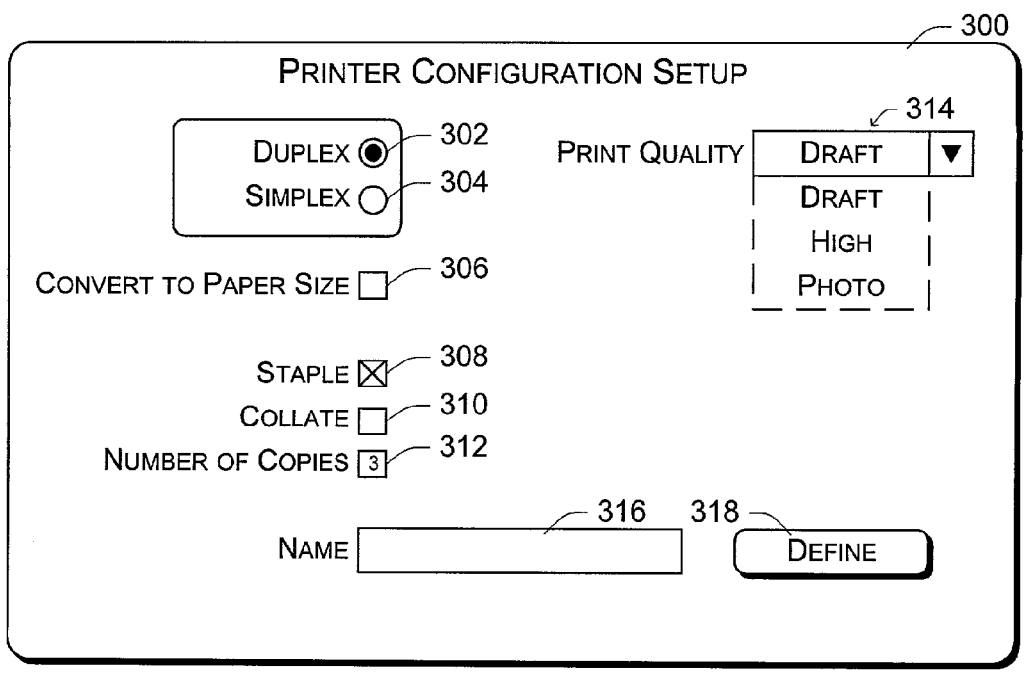
FIG. 5 illustrates an exemplary printer configuration setup user interface.

FIG. 5 illustrates an exemplary printer configuration setup user interface 300. Various print options are displayed to the user in interface 300, including a print duplex option 302, a print simplex option 304, a convert document to paper size option 306, a staple option 308, a collate option 310, a number of copies option 312, and a print quality option 314. Various graphical user input mechanisms may be employed to allow selection of the print options, such as conventional radio buttons (e.g., as used with options 302 and 304), conventional check boxes (e.g., as used with options 306-310), data-entry fields allowing the input of alphanumeric characters (e.g., as used with option 312), pull-down menus (e.g., as used with option 314), and so forth. The various options may be independent, or alternatively inter-related. For example, print duplex option 302 and print simplex option 304 may be mutually exclusive, so that only one can be selected (e.g., selection of one of the options 302 or 304 causes the other to be automatically de-selected). Which option is currently selected is indicated by a solid circle within the hollow circle of the option (e.g., option 302 is selected in FIG. 5). It is to be appreciated that these details are only exemplary, and may differ between computing platforms. Additionally, certain options (such as options 302 and 304) can be grouped together (e.g., a box around the options and their corresponding descriptive text) to separate them from other options or option groupings and reduce the possibility of user-confusion.

User interface 300 also allows the user to assign a name or other identifier to the selected options by typing in a name in data-entry field 316. Data-entry field 316 is a conventional data input mechanism, allowing user-input of one or more alphanumeric characters. Once the user has entered the name and his or her desired print options, these can be saved as a particular configuration by user-selection of a define button 318 (e.g., a conventional onscreen button). These saved configurations can be stored in a variety of different locations, such as user profile store 234 of FIG. 3.

Figure 6:
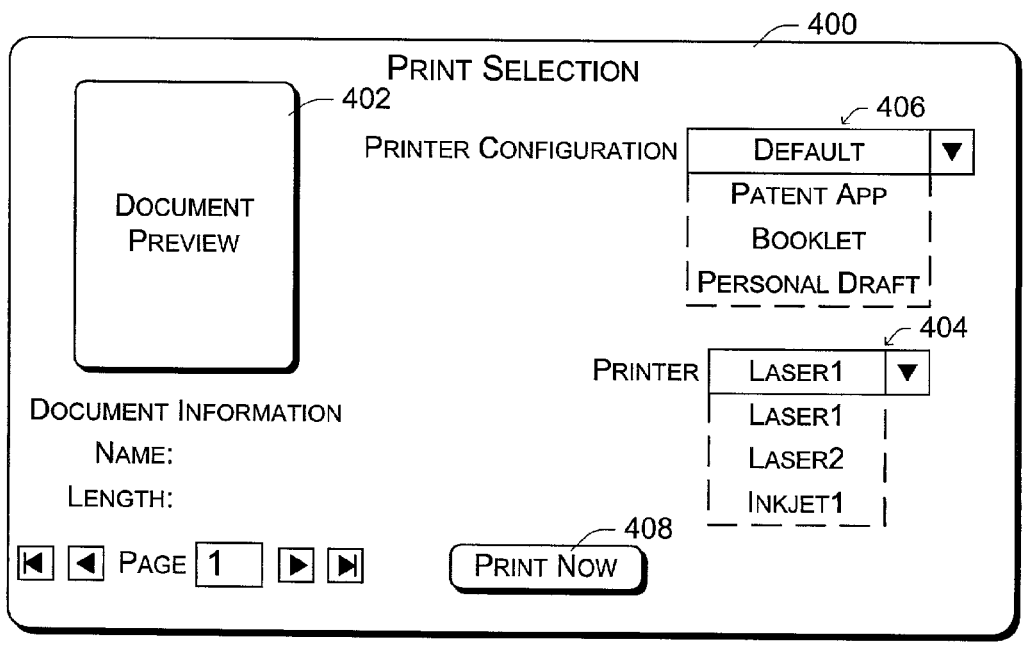
FIG. 6 illustrates an exemplary user interface that is displayed in response to a print request by a user.

FIG. 6 illustrates an exemplary user interface 400 that is displayed in response to a print request by a user (e.g., by selection of a print document option in services and options 248 of FIG. 4). A document preview window 402 is displayed in interface 400, allowing the user to view a page(s) of the document to be printed (analogous to document preview window 242 of FIG. 4). The user is further able to select a printer on which the document is to be printed via a pull-down menu 404, and one of the pre-defined printer configurations via a pull-down menu 406. Once the printer and configuration have been selected, the user can cause the document to be printed by selecting a print button 408.

In an alternate embodiment, feedback regarding the printer(s) is returned to the user via interface 400. In this alternate embodiment, the web imaging home page (e.g., content 212 or 208) communicates with the appropriate printer (or corresponding proxy server) to identify the print options that it supports. An identification of the supported configuration options is then provided to the user via interface 400. This identification can be negative (e.g., identify, for the selected printer configuration, each printer configuration option that the printer does not support) or alternatively positive (e.g., identify, for the selected printer configuration, each print option that the printer does support).

The determination of which print options are supported by a particular printer can be made by the printer or alternatively the web imaging home page. For example, the web imaging home page may communicate, to the printer, all of the print options that are requested in a particular printer configuration. The printer then checks which options it supports (and/or is currently able to carry out (e.g., the printer is loaded with staples)) and returns an indication of those to the web imaging home page. Alternatively, the web imaging home page may communicate, to the printer, a request for all possible print options that are supported (and/or currently provided by) the printer. Upon receiving all of the possible print options, the web imaging home page compares those options to the print options in the configurations to determine which print options within the configurations are supported by the printer.

Returning to FIG. 3, the process of printing a document in system 200 can be seen from the following example. Via the interface provided by web browser 204 and content 208, the user is able to access images from different imaging sources, such as web application 218, service 220, graphic store 216, or composition store 214. The user can also select one of the pre-defined configurations stored in user profile store 234. Additionally, the user can select a printer on which to print the selected document, such as printer 225 coupled to proxy server 222, or printer 224. When the user selects the print option (e.g., print button 408 of FIG. 6), an identification of the document as well as an identification of the configuration is communicated to the appropriate printer. Upon receipt of the print request, the printer prints the requested document, applying all of the requested print options in the configuration that it supports (e.g., functions that the printer offers (such as stapling) and that the printer is equipped to perform (such as being loaded with staples)).

The print request communicated to the printer includes an identifier of the document that is to be printed. Any of a wide variety of identifiers can be used, such as a Uniform Resource Locator (URL). This may be an identifier of a single document (e.g., a document in graphic store 216), or an identifier of a composition document (e.g., a document in composition store 214) that itself includes identifiers of one or more other documents. Alternatively, the data of the document to be printed may be communicated to the printer from the client 202, such as by the device content 236 of FIG. 3 (when downloaded and executed on the client 202). The data of the document may be communicated with the print request, or alternatively subsequent to the print request.

The print options of a configuration can be communicated to the printer in a variety of different manners. In one implementation, the options are encoded in the URL for the printer. For example, selection of a print document option causes the content 208 to generate a URL that identifies the printer, the document to be printed, and the print options that are in the user-selected predefined configuration, such as:

host.net/myprinter?document = memo.txt&staple =true& duplex=off&quality=draft which indicates the printer identified by "host.net/myprinter" is requested to print the document "memo.txt" with the staple option turned on, duplex turned off, and the print quality to be draft.

In another implementation, the options are added by a web server rather than imaging client 202. For example, selection of a print document option can cause the print request to be communicated to web server 210 hosting web imaging home client 212. The print options can then be encoded in a URL by imaging home client 212, which redirects web browser 204 to the URL of the requested printer.

In yet another implementation, the options are encoded in the URL by an identifier or pointer (e.g., a location where the user-selected configuration is stored). The requested printer (or print service) then uses this identifier or pointer to access the configuration and retrieve the print options stored therein.

In still another implementation, the user profile contains information indicating the desired options. These options can be pointed to or identified (e.g., by a portion of the URL) either directly or alternatively indirectly (e.g., a pointer to or identifier of the user profile, from which the "current" or "default" print options can be obtained). After being used by a print service, the indication of desired options may optionally be reset to indicate no particular preference.

Figure 7:
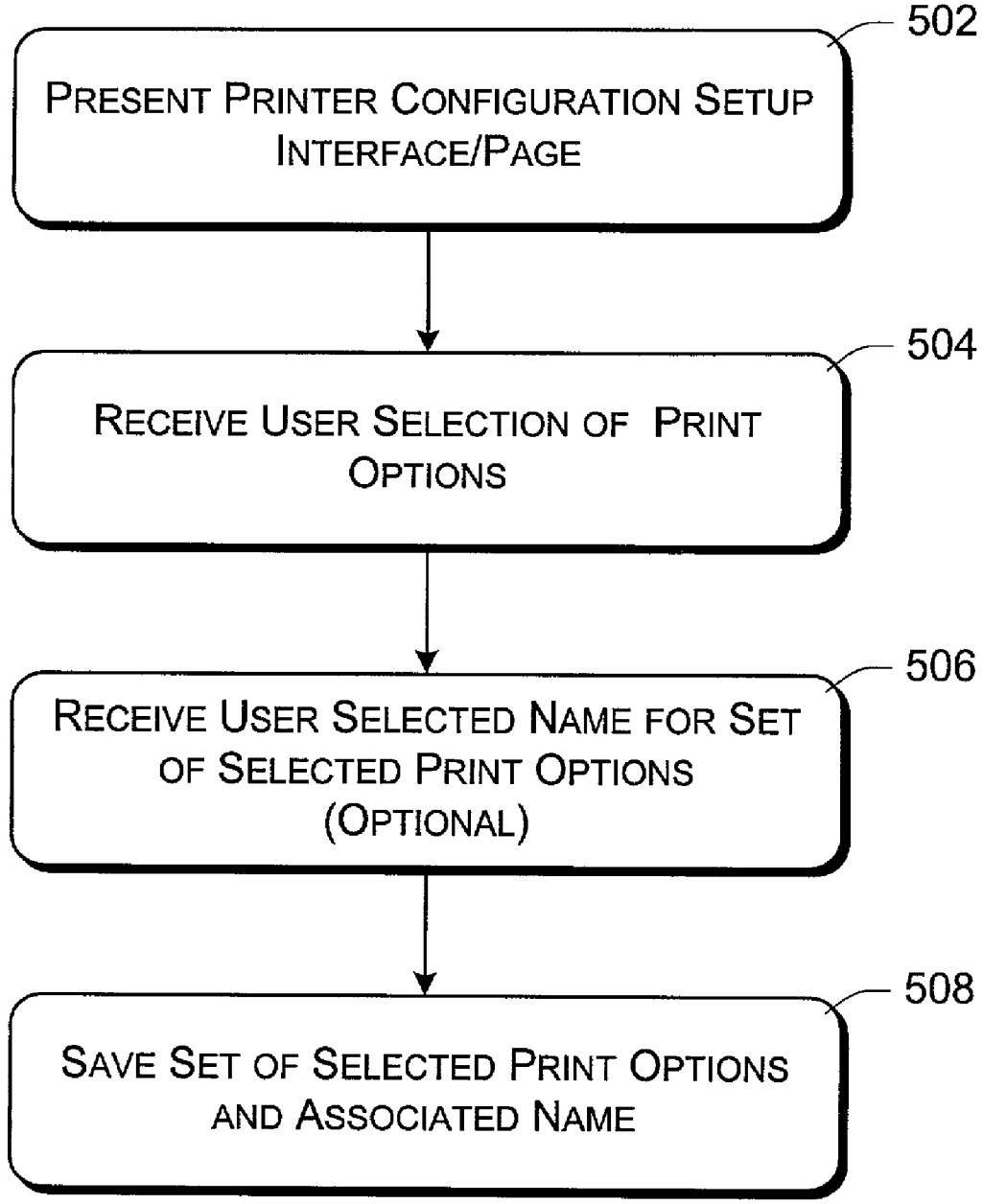
FIG. 7 is a flowchart illustrating an exemplary process for pre-defining printer configurations.

FIG. 7 is a flowchart illustrating an exemplary process 500 for predefining printer configurations. The process of FIG. 7 is performed by web imaging host content, and may optionally be implemented in software.

Initially, a printer configuration setup interface (e.g., a web page) is presented for display to the user (act 502). The user selection of one or more of the print options is then received (act 504), as is (optionally) a user-selected name for the configuration (act 506). If the user does not select a name for the configuration then a default name may be applied (alternatively, the user may be required to select a name for the configuration). The user-selected print options are then saved (at a local and/or remote location) along with the user-selected name (act 508), allowing the user-defined configuration to be subsequently selected (by name) by the user when printing a document.

Figure 8:
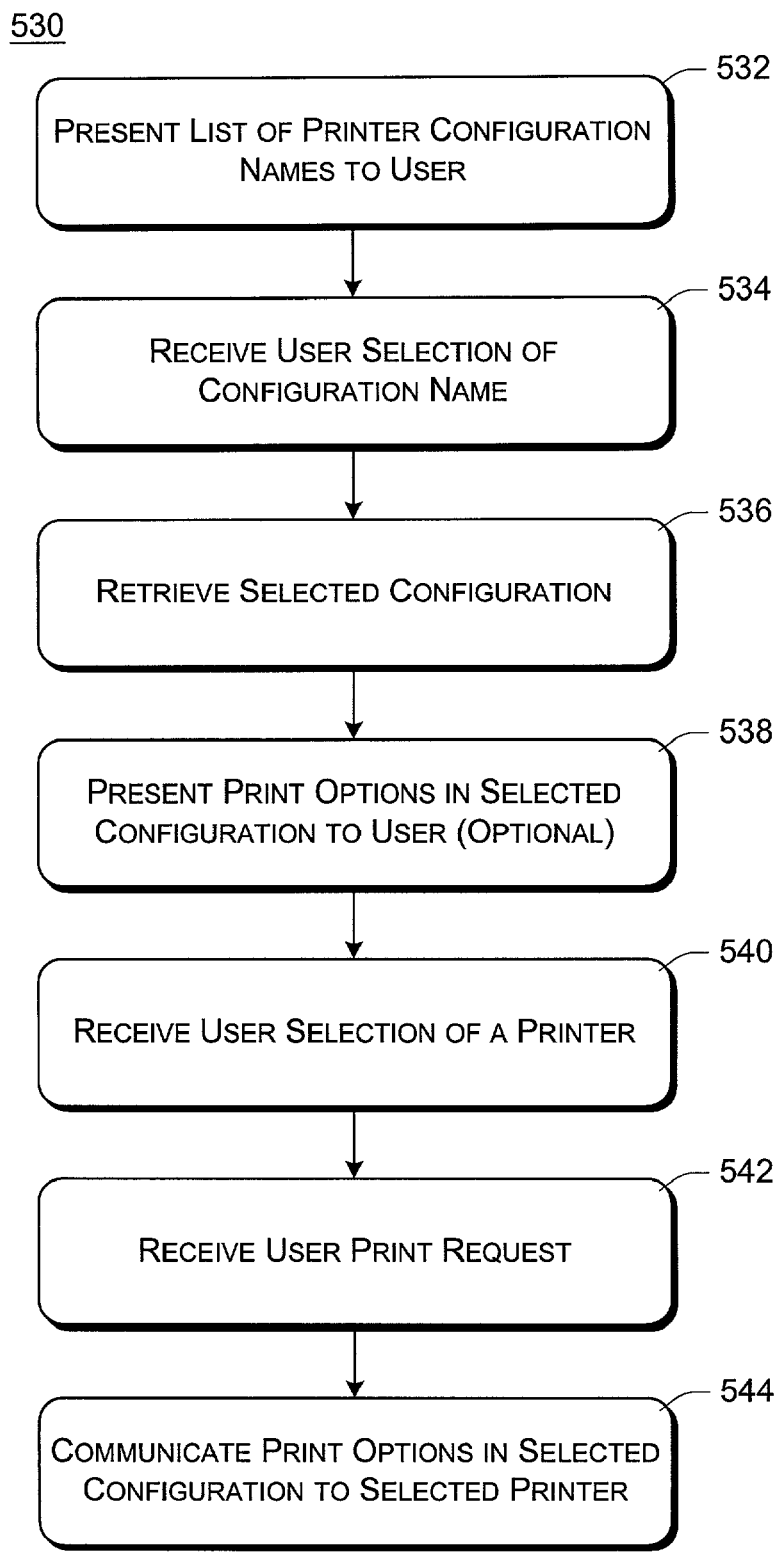
FIG. 8 is a flowchart illustrating an exemplary process for printing using pre-defined printer configurations.

FIG. 8 is a flowchart illustrating an exemplary process 530 for printing using pre-defined printer configurations. The process of FIG. 8 is performed by web imaging host content, and may optionally be implemented in software.

Initially, a list of printer configuration names is presented to the user (act 532). A user-selection of one of the configuration names is received (act 534) and the selected configuration retrieved (act 536). Optionally, a default configuration name may be used in the event the user does not select a configuration name. The print options in the selected configuration set are optionally presented to the user (act 538) and a user selection of a printer is received (act 540). A user print request is then received (act 542), and the print options in the selected configuration communicated to the selected printer (act 544).

Figure 9:
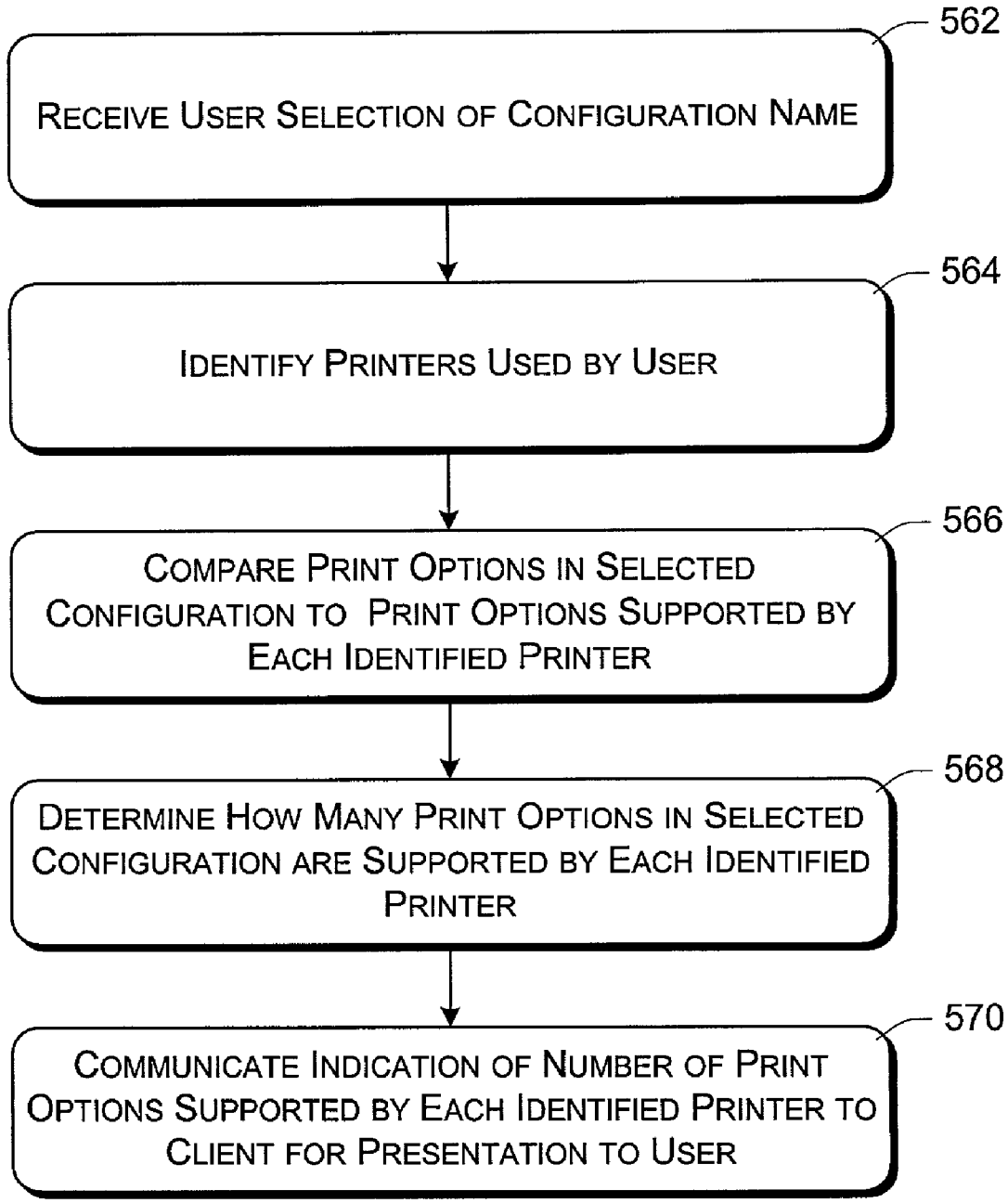
FIG. 9 is a flowchart illustrating another exemplary process for printing using pre-defined printer configuration options.

FIG. 9 is a flowchart illustrating another exemplary process 560 for printing using pre-defined printer configuration options. The process of FIG. 9 is performed by an imaging host, and may optionally be implemented in software. The process 560 is similar to the process 530 of FIG. 8, except that additional intelligence is built in to the imaging host to assist the user in selection of a printer.

Initially, user selection of a configuration name is received (act 562). Printers used by the user are then identified (act 564). These can be identified in any of a wide variety of manners, such as a set of default printers based on the user's location, a set of printers the user has previously printed to, a set of printers that the user has identified (e.g., the "favorite" printers in portion 246 of FIG. 4), and so forth. A comparison is then made between the print options included in the configuration selected by the user and the print options that are supported by each of the identified printers (act 566). This comparison may be made based on information already known to the imaging host (e.g., it may maintain a record of the print options supported by different printers) or alternatively based on information obtained by the imaging host from the different printers.

A determination is then made as to how many print options in the selected configuration are supported by each of the identified printers (act 568). The number of print options supported by each of the identified printers is then communicated to the user's client computer for presentation to the user (act 570). By presenting this number of print options supported by each of the printers to the user, the user is presented with additional information that may affect his or her decision of which printer he or she should select for printing of a particular document. Alternatively, rather than identifying a number of print options supported by each of the printers to the user, an indication of the printer(s) with the highest number of print options may be communicated to the client for presentation of a "suggested" printer to the user. Optionally, the specific print options from the selected configuration that are supported by each printer may also be communicated to the user's client computer for presentation to the user, thereby allowing the user to make decisions based on the specific print options supported by the printers.

Various acts are illustrated in the processes of FIGS. 7, 8, and 9 above. However, no particular required order is to be associated with the acts based on their order of presentation in FIGS. 7, 8, and 9. The acts may be performed in different orders than they are presented in FIGS. 7, 8, and 9, and multiple acts may be performed concurrently (or partly concurrently).

Figure 10:
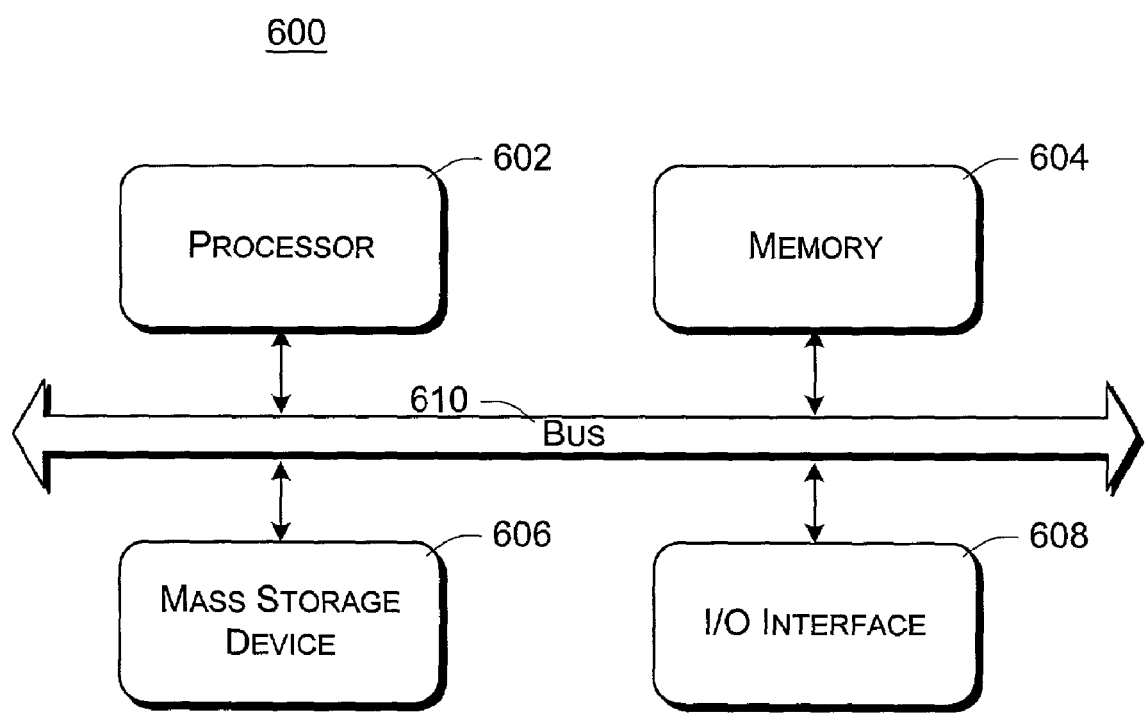
FIG. 10 illustrates an exemplary computer system in additional detail.

FIG. 10 illustrates an exemplary computer system 600 in additional detail. Computer system 600 can be, for example, a network client 102 of FIG. 1, an imaging client 152 or server 154 or 156 of FIG. 2, an imaging client 202, server 210 or 222 of FIG. 3, etc. Computer system 600 represents a wide variety of computing devices, such as desktop computers, portable computers, dedicated server computers, multi-processor computing devices, cellular telephones, personal digital assistants (PDAs), handheld or pen-based computers, microcontroller-based electronic devices, gaming consoles, and so forth.

Computer system 600 includes a processor 602, a memory 604, a mass storage device 606, and an input/output (I/O) interface 608, all coupled to a bus 610. Bus 610 represents one or more buses in computer system 600, such as a system bus, processor bus, accelerated graphics port (AGP), peripheral component interconnect (PCI), and so forth. The bus architecture can vary by computing device as well as by manufacturer. I/O interface 608 is a conventional interface allowing components of system 600 (e.g., processor 602) to communicate with other computing devices via a network, such as network 158 of FIG. 2. I/O interface 608 may be, for example, a modem, a network interface card (NIC), and so forth.

Memory 604 represents volatile and/or nonvolatile memory used to store instructions and data for use by processor 602. Typically, instructions are stored on a mass storage device 606 (or nonvolatile memory) and loaded into a volatile memory 604 for execution by processor 602. Additional memory components may also be involved, such as cache memories internal or external to processor 602. Various embodiments of the invention may be implemented, at different times, in any of a variety of computer readable media that is part of, or readable by, system 600. For example, such computer readable media may be mass storage device 606, memory 604 or a cache memory, a removable disk (not shown) that is accessible by processor 602 or another controller of system 600 (such as a magnet disk or optical disk), and so forth.

Computer system 600 is exemplary only. It is to be appreciated that additional components (not shown) can be included in system 600 and some components illustrated in system 600 need not be included. For example, a display adapter, additional processors or storage devices, additional I/O interfaces, and so forth may be included in system 600, or mass storage device 606 may not be included.

I/O interface 608 is a conventional interface allowing components of system 600 (e.g., processor 602) to communicate with other computing devices via a network, such as network 158 of FIG. 2.

The discussions herein refer primarily to software components and modules that can be executed by a computing device. It is to be appreciated, however, that the components and processes described herein can be implemented in software, firmware, hardware, or a combination thereof. By way of example, a programmable logic device (PLD) or application specific integrated circuit (ASIC) could be configured or designed to implement various components and/or processes discussed herein.

The discussions of printing herein refer primarily to a printing process using a personal imaging repository accessed through an imaging extension. It should be noted, however, that this process is only exemplary and that other means of printing documents using web-based techniques that do not involve an imaging extension or personal imaging repository may also be used. For example, it is possible to use a file upload mechanism existing in many browsers to upload the document to be printed to the web service representing the printer. This file upload mechanism is an alternative to automatically accessing the document through the imaging extension. Once the document to be printed is available to the web service representing the printer, the web service may allow the user to select the desired option configuration. In other words, the web service provides the same sorts of capabilities described in the case where an imaging extension is used to obtain access to the print data.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   receiving a user selection of one or more non-printer-specific print options via a network service;
   storing the user selection of the one or more non-printer-specific print options in a user profile store;
   wherein the one or more non-printer-specific print options are identified for subsequent resolution, and
   wherein the one or more non-printer-specific print options can be applied to a plurality of other network services, the non-printer-specific print options serving to configure a printer in a particular manner for printing, the particular manner defined by the one or more print non-printer-specific options submitted with a print request to the printer where the one or more non-printer-specific options are used in printing a document and the printer applies requested print options that the printer supports in accordance with the non-printer-specific print options that are identified in the print request.

2. A method as recited in claim 1, wherein the network service comprises an Internet imaging home page.

3. A method as recited in claim 1, wherein the other network services comprise one or more other printing services communicatively coupled to the network service.

4. A method as recited in claim 1, further comprising:
   receiving a user-selected name for the one or more non-printer-specific print options;
   storing the one or more non-printer-specific print options as associated with the user-selected name; and
   allowing subsequent selection of the one or more non-printer-specific print options by the user based on the user-selected name.

5. One or more computer readable media encoded with a plurality of instructions that, when executed by one or more processors, causes the one or more processors to perform acts including:
   communicating a plurality of possible print options to a client computer;
   receiving a user indication of selected ones of the plurality of possible print options;
   receiving an identifier, indicated by the user, associated with the selected print options;
   saving the selected print options with the associated identifier; and
   making the selected print options subsequently available to the user for configuring of a plurality of printers in a particular manner, the particular manner defined by the one or more print options submitted with a print request to a respective one of the plurality of printers where the one or more options are used in printing a document, wherein each of the plurality of print options is not specific to a particular printer and the respective one of the plurality of printers applies requested print options that the printer supports in accordance with the non-printer-specific print options that are identified in the print request.

6. One or more computer readable media as recited in claim 5, wherein the making further comprises making the selected print options subsequently available for user-selection by the identifier associated with the selected print options.

7. One or more computer readable media as recited in claim 5, further comprising saving a plurality of sets of selected print options and associated identifiers at a network location remote from the client computer, and making each of the plurality of sets of selected print options subsequently available to the user for configuring of a plurality of printers.

8. A graphical user interface comprising:
a plurality of portions illustrating user-selectable non-printer-specific print options and graphical mechanisms via which a user can select the print options;
an additional user-input mechanism via which the user can input an identifier of the selected non-printer-specific print options; and
another graphical mechanism via which the user can indicate a desire to save the selected non-printer-specific print options as associated with the identifier and for subsequent provision to a plurality of printers, the print options serving to configure a printer in a particular manner for printing, the particular manner defined by the one or more non-printer-specific print options submitted with a print request to a respective one of the plurality of printers where the one or more non-printer-specific print options are used in printing a document and the respective one of the plurality of printers applies requested print options that the printer supports in accordance with the non-printer-specific print options that are identified in the print request.

9. A graphical user interface as recited in claim 8, wherein one or more of the graphical mechanisms in the plurality of portions comprises a checkbox.

10. A graphical user interface as recited in claim 8, wherein one or more of the graphical mechanisms in the plurality of portions comprises a data input box via which the user can input alphanumeric characters.

11. A graphical user interface as recited in claim 8, wherein the identifier of the selected non-printer-specific print options comprises a user-specified name.

12. A graphical user interface as recited in claim 8, wherein the other graphical mechanism comprises a user-selectable on-screen button.

13. A graphical user interface as recited in claim 8, wherein the graphical mechanisms in the plurality of portions include one or more of: a check box, a radio button, a list box, an editable text box, a command button, a drop-down list, a popup menu, a spinner, and a slider.

14. One or more computer readable media encoded with a plurality of instructions that, when executed by one or more processors, causes the one or more processors to perform acts including:
receiving an indication of one of a plurality of sets of non-printer-specific print options to be used in printing a document irrespective of a printer on which the document is to be printed, the non-printer-specific print options serving to configure the printer in a particular manner for printing, the particular manner defined by the one or more non-printer-specific print options submitted with a print request to a printer where the one or more non-printer-specific print options are used in printing the document;
receiving an indication of one of a plurality of printers on which the document is to be printed; and
communicating the indicated set of non-printer-specific print options to the indicated printer irrespective of whether the printer supports one or more of the non-printer-specific print options identified in the set of non-printer-specific print options, wherein the printer applies requested print options that the printer supports in accordance with the non-printer-specific print options that are identified in the print request.

15. One or more computer readable media as recited in claim 14, wherein the plurality of instructions further cause the one or more processors to perform acts including:
determining, based on the indication of the one printer on which the document is to be printed, which of the non-printer-specific print options in the indicated set of non-printer-specific print options is supported by the one printer; and
communicating, for display to the user, an indication of which of the non-printer-specific print options in the indicated set of non-printer-specific print options is supported by the one printer.

16. One or more computer readable media as recited in claim 14, wherein the plurality of instructions further cause the one or more processors to perform acts including:
determining, based on the indication of the one printer on which the document is to be printed, which of the non-printer-specific print options in the indicated set of non-printer-specific print options is supported by the one printer; and
communicating, for display to the user, an indication of which of the non-printer-specific print options in the indicated set of non-printer-specific print options is not supported by the one printer.

17. One or more computer readable media as recited in claim 14, wherein the plurality of instructions further cause the one or more processors to perform acts including:
determining, for each of the plurality of printers, which of the non-printer-specific print options in the indicated set of non-printer-specific print options is supported by the printer;
identifying one or more of the plurality of printers that support the most non-printer-specific print options in the indicated set of non-printer-specific print options; and
communicating, for display to the user, the identified one or more printers.

18. A system comprising:
a network interface configured to allow the system to communicate with one or more other systems via a network; and
a printer configuration user interface, communicatively coupled to the network interface, wherein the printer configuration user interface is configured to allow a user of a client interface to select print options and group the selection together as a configuration associated with a particular name, and wherein the printer configuration user interface is further configured to allow the user to select print options without regard for print options supported by a printer that the user can subsequently print to, the print options serving to configure the printer in a particular manner for printing, the particular manner defined by the one or more print options submitted with a print request to the printer where the one or more options are used in printing the document and to direct transmission of the configuration to a remote storage location for subsequent retrieval by this printer configuration user interface or another printer configuration user interface, wherein each of the plurality of print options is not specific to a particular printer and the printer applies requested print options that the printer supports in accordance with the non-printer-specific print options that are identified in the print request.

19. A system as recited in claim 18, further comprising:
a print user interface, communicatively coupled to the network interface, wherein the printer user interface is configured to allow the user to select one of the configurations by its associated name, and further configured to allow the user to select a printer that is to be used to print a document using the configuration.

20. A system as recited in claim 19, wherein the print user interface is further configured to allow the user to select one of the configurations without regard for print options supported by the printer that is to be used to print the document.

21. A method, implemented in a print service coupled to a network, the method comprising:
   receiving, from a device in the network, a print request identifying both a document to be printed and a set of desired non-printer-specific print options, wherein the set of desired non-printer-specific print options includes a corresponding setting for one or more of the desired non-printer-specific print options;
   checking whether a printer corresponding to the print service supports the desired non-printer-specific print options; and
   for each option in the set of desired non-printer-specific print options,
      applying the setting corresponding to the option if the printer supports the non-printer-specific print option, and
      ignoring the setting corresponding to the option if the printer does not support the non-printer-specific print option.

22. A method as recited in claim 21, wherein the print service comprises a print server corresponding to the printer.

23. A method as recited in claim 21, wherein the print service is implemented at the printer.

24. A method as recited in claim 21, wherein the applying comprises applying the setting corresponding to the non-printer-specific print option if the printer supports the non-printer-specific print option without regard for whether the printer is currently capable of carrying out the non-printer-specific print option.

* * * * *